(12) United States Patent
Projetti et al.

(10) Patent No.: US 12,111,434 B2
(45) Date of Patent: *Oct. 8, 2024

(54) MEMS-BASED ROTATION SENSOR FOR SEISMIC APPLICATIONS AND SENSOR UNITS HAVING SAME

(71) Applicant: Schlumberger Technology Corporation, Sugar Land, TX (US)

(72) Inventors: Maxime Projetti, Gif-sur-Yvette (FR); Olivier Vancauwenberghe, Le Pecq (FR); Nicolas Goujon, Oslo (NO); Hans Paulson, Horten (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 18/050,248

(22) Filed: Oct. 27, 2022

(65) Prior Publication Data

US 2023/0070241 A1 Mar. 9, 2023

Related U.S. Application Data

(60) Continuation of application No. 16/657,563, filed on Oct. 18, 2019, now Pat. No. 11,487,031, which is a
(Continued)

(51) Int. Cl.
*G01V 1/16* (2006.01)
*G01P 15/125* (2006.01)
(Continued)

(52) U.S. Cl.
CPC ............ *G01V 1/164* (2013.01); *G01P 15/125* (2013.01); *G01V 1/003* (2013.01); *G01V 1/18* (2013.01);
(Continued)

(58) Field of Classification Search
None
See application file for complete search history.

(56) References Cited

U.S. PATENT DOCUMENTS

| 2,657,373 | A | 10/1953 | Piety |
| 5,734,104 | A | 3/1998 | Panenka |
(Continued)

FOREIGN PATENT DOCUMENTS

| GB | 2392495 A | 3/2004 |
| WO | 2010054216 A2 | 5/2010 |
| WO | 2012138619 A2 | 10/2012 |

OTHER PUBLICATIONS

Bernstein, Acceleration/Vibration an Overview of MEMS Inertial Sensing Technology, Feb. 1, 2003 (7 pages).
(Continued)

*Primary Examiner* — Hovhannes Baghdasaryan
(74) *Attorney, Agent, or Firm* — Jeffrey D. Frantz

(57) ABSTRACT

The present disclosure is directed to a MEMS-based rotation sensor for use in seismic data acquisition and sensor units having same. The MEMS-based rotation sensor includes a substrate, an anchor disposed on the substrate and a proof mass coupled to the anchor via a plurality of flexural springs. The proof mass has a first electrode coupled to and extending therefrom. A second electrode is fixed to the substrate, and one of the first and second electrodes is configured to receive an actuation signal, and another of the first and second electrodes is configured to generate an electrical signal having an amplitude corresponding with a degree of angular movement of the first electrode relative to the second electrode. The MEMS-based rotation sensor further includes closed loop circuitry configured to receive the electrical signal and provide the actuation signal. Related
(Continued)

methods for using the MEMS-based rotation sensor in seismic data acquisition are also described.

20 Claims, 5 Drawing Sheets

Related U.S. Application Data division of application No. 15/407,241, filed on Jan. 16, 2017, now Pat. No. 10,451,753, which is a division of application No. 14/104,806, filed on Dec. 12, 2013, now Pat. No. 9,547,095.

(60) Provisional application No. 61/739,602, filed on Dec. 19, 2012.

(51) Int. Cl.
*G01V 1/00* (2006.01)
*G01V 1/18* (2006.01)
*G01V 1/38* (2006.01)
*G01C 19/5712* (2012.01)

(52) U.S. Cl.
CPC ....... *G01V 1/3808* (2013.01); *G01C 19/5712* (2013.01); *G01V 1/189* (2013.01); *G01V 1/38* (2013.01)

(56) References Cited

U.S. PATENT DOCUMENTS

| | | | |
|---|---|---|---|
| 6,393,914 | B1 | 5/2002 | Zarabadi et al. |
| 6,520,017 | B1 | 2/2003 | Schoefthaler et al. |
| 6,845,669 | B2 | 1/2005 | Acar et al. |
| 7,100,446 | B1 | 9/2006 | Acar et al. |
| 7,623,414 | B2 | 11/2009 | Boergen et al. |
| 8,104,346 | B2 | 1/2012 | Paulson |
| 8,347,716 | B2 | 1/2013 | Cazzaniga et al. |
| 8,733,172 | B2 | 5/2014 | Coronato et al. |
| 8,875,578 | B2 | 11/2014 | Smith |
| 9,547,095 | B2 | 1/2017 | Projetti et al. |
| 2002/0020219 | A1 | 2/2002 | DeRoo et al. |
| 2002/0113281 | A1 | 8/2002 | Cunningham et al. |
| 2002/0189351 | A1 | 12/2002 | Reeds et al. |
| 2002/0189352 | A1 | 12/2002 | Reeds et al. |
| 2003/0130976 | A1 | 7/2003 | Au |
| 2003/0140699 | A1 | 7/2003 | Pike et al. |
| 2004/0006430 | A1 | 1/2004 | Harmon et al. |
| 2004/0113647 | A1 | 6/2004 | Deb et al. |
| 2004/0239341 | A1 | 12/2004 | Aoyagi et al. |
| 2006/0112764 | A1 | 6/2006 | Higuchi |
| 2006/0239117 | A1 | 10/2006 | Singh et al. |
| 2006/0245300 | A1 | 11/2006 | De Kok et al. |
| 2007/0245826 | A1 | 10/2007 | Cardarelli |
| 2008/0316860 | A1 | 12/2008 | Muyzert et al. |
| 2009/0007661 | A1 | 1/2009 | Nasiri et al. |
| 2009/0040870 | A1 | 2/2009 | Kamata |
| 2009/0064780 | A1 | 3/2009 | Coronato et al. |
| 2010/0033299 | A1 | 2/2010 | Davis |
| 2010/0116054 | A1* | 5/2010 | Paulson ............... G01P 15/131 73/514.32 |
| 2010/0195439 | A1 | 8/2010 | Muyzert |
| 2010/0302909 | A1 | 12/2010 | Muyzert et al. |
| 2010/0307241 | A1 | 12/2010 | Raman et al. |
| 2011/0061460 | A1 | 3/2011 | Seeger et al. |
| 2011/0067495 | A1 | 3/2011 | Yu et al. |
| 2011/0228635 | A1 | 9/2011 | Tenghamn |
| 2012/0026834 | A1 | 2/2012 | Muyzert et al. |

OTHER PUBLICATIONS

Boser, et al., "Surface micromachined accelerometers," IEEE Journal of Solid-State Circuits, 1996, vol. 31, Issue. 3, pp. 366-375.
Brokesova et al., "New portable sensor system for rotational seismic motion measurements" Review of Scientific Instruments, 81, 2010 (8 pages).
Cowsik et al., "Performance characteristics of a rotational seismometer for near-field and engineering applications," Bulletin of the Seismological Society of America, vol. 99, No. 2B, 2009, pp. 1181-1189.
Kraft, et al., "Closed-Loop silicon accelerometers," IEEE Proceedings—Circuits, Devices and Systems, 1998, Vo. 145, Issue 5, pp. 325-331.
Nigbor, "Six-degree-of-freedom ground-motion measurement," Bulletin of the Seismological Society of America, vol. 84, No. 5, 1994, pp. 1665-1669.
Peters, "Linear rotary differential capacitance transducer," Review of Scientific Instruments, 60(8) 1989, pp. 2789-2793.
Schreiber et al., "Ring laser measurements of ground rotations for seismology," Bulletin of the Seismological Society of America, vol. 99, No. 2B, 2009, pp. 1190-1198.
Strunc, et al., "Sensor of Rotational Movement Around Vertical Axis for Seismic Measurement," Acta Research Reports, , 2009, No. 18, pp. 67-74.
Takeo, "Ground rotational motions recorded in near-source region of earthquakes," Geophysical Research Letters, vol. 25, No. 6, 1998, pp. 789-792.
Teisseyre et al., "Seismic rotation waves: basic elements of theory and recording," Annals of Geophys. 2003, 46, 671-685. xiii, 18, 19, 20.
International Search Report and Written Opinion issued in the related PCT application PCT/US2013/075396, dated Apr. 7, 2014 (12 pages).
International Preliminary Report on patentability issued in the related PCT application PCT/US2013/075396, dated Jun. 23, 2015 (8 pages).
Search Report issued in the related EP Application 13865987.5, dated Dec. 3, 2015 (4 pages).
Office Action issued in the related EP Application 13865987.5, dated Dec. 16, 2015 (5 pages).
Office Action issued in the related EP Application 13865987.5, dated Aug. 11, 2016 (5 pages).
Examination report issued in the related GC Application GC 2013/26086 dated Feb. 27, 2017 (4 Pages).
Office Action issued in the related CN Application 201380071994.X, dated Oct. 31, 2016 (13 pages).
Office Action issued in the related CN Application 201380071994.X, dated Jul. 12, 2017 (11 pages).
Examination report issued in the related AU Application 2013363143 dated Feb. 24, 2017 (4 Pages).
Examination report issued in the related CA Application 2895190 dated Sep. 18, 2019 (8 Pages).
Examination report issued in the related CA Application 2895190 dated May 25, 2020 (6 Pages).
Office Action issued in the BR application No. 112015014826.3, dated Jun. 10, 2020 (4 pages).

\* cited by examiner

MEMS-BASED ROTATION SENSOR FOR SEISMIC APPLICATIONS AND SENSOR UNITS HAVING SAME

RELATED APPLICATIONS

This application is a continuation of patent application Ser. No. 16/657,563 that was filed on Oct. 18, 2019, which is a divisional application of patent application Ser. No. 15/407,241, filed Jan. 16, 2017, which is a divisional Application of patent application Ser. No. 14/104,806 that was filed on Dec. 12, 2013 and is now U.S. Pat. No. 9,547,095 U.S., and claims the benefit of U.S. Provisional Patent Application Ser. No. 61/739,602 filed Dec. 19, 2012, all of which are incorporated herein by reference in their entirety.

BACKGROUND

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Historically, seismic data acquisition along a surface has been accomplished by placing seismic sources and sensors along a straight line. In such a configuration, it is assumed that the reflection points in the ground are located in a two-dimensional plane delimited by the transverse line and the vertical axis. This is often referred to as a two-dimensional seismic survey. However, three-dimensional seismic surveys are often preferred in order to obtain better signal quality and to improve the space and the time resolution. One of the drawbacks of three-dimensional surveys is the requirement of a large amount of sensors, which necessitates a large deployment crew. This results in increased costs and decreased efficiency. Accordingly, improved seismic sensors allowing for sparse sampling and thus less deployment of sensors without compromising data quality are desired.

BRIEF SUMMARY

The present disclosure is directed to a MEMS-based rotation sensor for use in seismic data acquisition and sensor units having same. A sensor unit for land-based seismic data acquisition includes a particle motion sensor for measuring a vertical wavefield in which the vertical wavefield has a horizontal gradient. The sensor unit further includes a first MEMS-based rotational accelerometer for measuring an x-component of the horizontal gradient and a second MEMS-based rotational accelerometer positioned orthogonally to the first MEMS-based rotational accelerometer. The second MEMS-based rotational accelerometer measures a y-component of the horizontal gradient. At least one of the first and second MEMS-based rotational accelerometers includes a substrate, an anchor disposed on the substrate, and a proof mass coupled to the anchor via a plurality of flexural springs. The proof mass has a first electrode coupled to and extending therefrom. A second electrode is fixed to the substrate, and one of the first and second electrodes is configured to receive an actuation signal, and another of the first and second electrodes is configured to generate an electrical signal having an amplitude corresponding with a degree of angular movement of the first electrode relative to the second electrode. The MEMS-based rotation sensor further includes closed loop circuitry configured to receive the electrical signal and provide the actuation signal.

A seismic data acquisition system is described having one or more sources for generating seismic waves and one or more sensor units for recording seismic waves generated by the sources. The one or more sensor units include a first seismic sensor for measuring a vertical wavefield of the seismic waves, and a second seismic sensor for measuring a gradient of the vertical wavefield.

A method for performing seismic data acquisition is also described. The method includes generating seismic waves using one or more sources, and recording seismic waves generated by the sources using one or more sensor units. The one or more sensor units include a first seismic sensor for measuring a vertical wavefield of the seismic waves and a second seismic sensor for measuring a gradient of the vertical wavefield.

BRIEF DESCRIPTION OF THE DRAWINGS

Reference is now made to the following descriptions taken in conjunction with the accompanying drawings.

DETAILED DESCRIPTION

Various embodiments of a MEMS-based rotation sensor and methods of using such a MEMS-based rotation sensor according to the present disclosure are described. It is to be understood, however, that the following explanation is merely exemplary in describing the devices and methods of the present disclosure. Accordingly, several modifications, changes and substitutions are contemplated.

Figure 1:
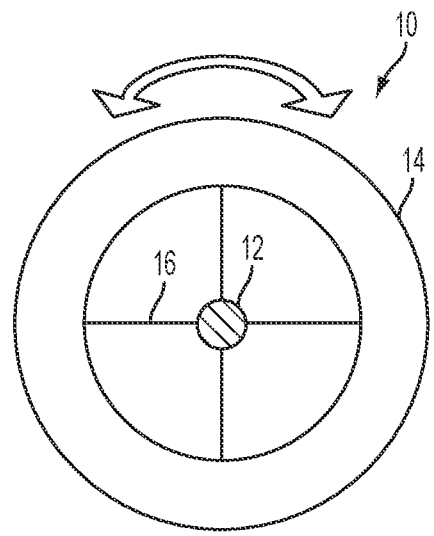
FIG. 1 illustrates a schematic view of a MEMS-based rotation sensor according to the present disclosure.

FIG. 1 schematically illustrates mechanical structure of a capacitive microelectromechanical system (MEMS)-based rotation sensor 10 according to one embodiment of the present disclosure. The MEMS-based design of the sensor 10 is advantageous due to its size, low power dissipation and low cost. The MEMS-based rotation sensor 10 includes a central anchor 12 coupled to a seismic mass 14 via a plurality of flexure springs 16. In some embodiments, the central anchor 12 has a radius of approximately 300 μm, while the seismic mass 14 has a width of approximately 300 μm. Of course, other embodiments are contemplated in which the central anchor 12 and seismic mass 14 have other dimensions. The anchor 12 is coupled to the outside environment and thus experiences angular accelerations, which causes the seismic mass 14 to rotate due to inertial effects. The flexure springs 16 are able to bend, thus permitting rotation of the seismic mass 14 about anchor 12.

Figure 2:
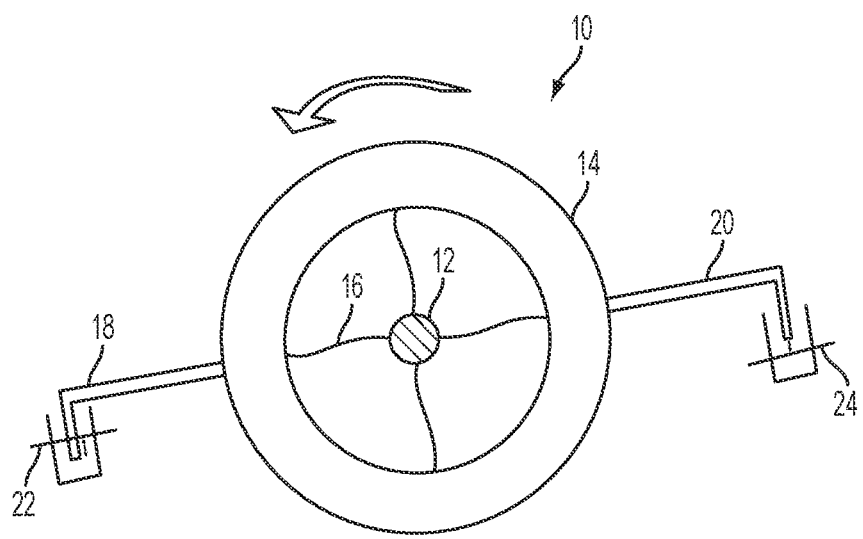
FIG. 2 illustrates rotation of the MEMS-based rotation sensor of FIG. 1.

Referring to FIG. 2, the MEMS-based rotation sensor 10 includes a pair of beam-shaped electrodes 18, 20, which are disposed at opposing sides of the sensor. In some embodiments, such electrodes 18, 20 have a length of 550 μm and a width of 5 μm. Of course, other embodiments are contemplated in which the beam-shaped electrodes 18, 20 have other dimensions. The pair of electrodes 18, 20 cooperates to detect differential capacitance resulting from angular displacement of the MEMS-based rotation sensor. In the example of FIG. 2, electrode 18 is displaced from its origin position 22 as a result of the angular displacement of the seismic mass 14. Electrode 20 is also displaced in an opposite direction (relative to displacement of electrode 18) from its origin position 24 as a result of the displacement of the seismic mass 14. As a result, electrode 18 increases its capacitance of a quantity 6, while electrode 20 decreases its capacitance of the same quantity E. The capacitance difference of the two electrodes 18, 20 gives the capacitance variation quantity 6, which is related to the rotation of the seismic mass 14. Angular displacements of the seismic mass 14 are thus converted into electrical signals using such a differential capacitor detector. It will be appreciated that the respective change in capacitance at the electrodes 18 and 20 may also be different quantities, may vary by a linear function, and may also vary by a non-linear function.

Figure 3:
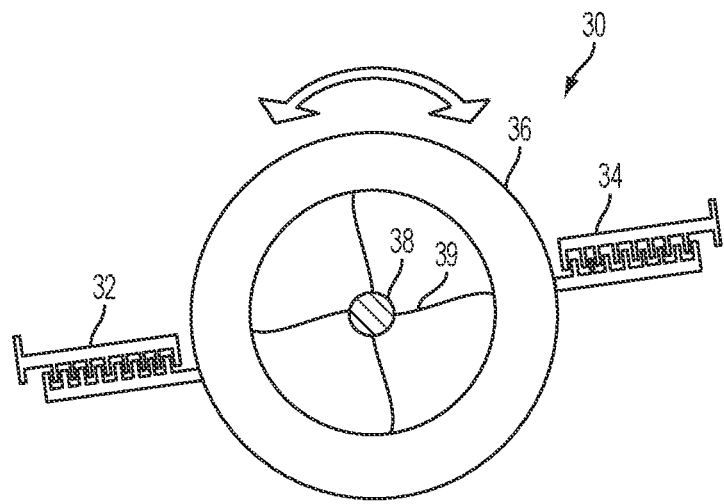
FIG. 3 illustrates a schematic view of a MEMS-based rotation sensor according to another embodiment of the present disclosure.

Referring to FIG. 3, a MEMS-based rotation sensor 30 according to another embodiment of the present disclosure is illustrated to include sliding comb electrodes 32, 34 which are used for detection of differential capacitance resulting from rotation of a seismic mass 36. In some embodiments, the sliding comb electrodes 32, 34 have a finger length of 20 μm, a finger width of 3 μm, a comb length of 420 μm, and a comb width of 50 μm. Of course, other dimensions are contemplated. The MEMS-based rotation sensor 30 further includes a central anchor 38 and flexural springs 39, which couple the seismic mass 36 to the central anchor. The comb electrodes 32, 34 generate electromechanical efforts in order to balance seismic angular displacements at the same time as differential capacitance detection. Capacitance variations of the MEMS-based rotation sensor 30 generate a current, which passes through a charge amplifier to obtain an output voltage. At this point, open-loop readout is achieved whereby the output voltage is proportional to the input angular accelerations measured by the MEMS-based rotation sensor 30.

Figure 4:
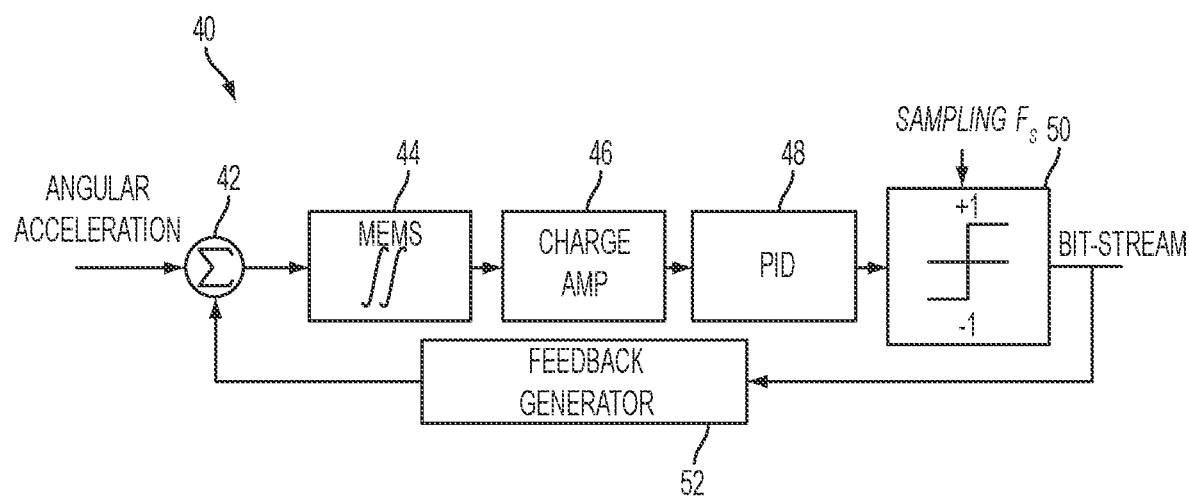
FIG. 4 illustrates a flowchart of a control loop of a MEMS-based rotation sensor according to the present disclosure.

The MEMS-based rotation sensors described herein may be used with feedback control loop architecture that linearizes the force function with respect to a control voltage to thereby increase dynamic performances. This can be accomplished with analog control, digital control, or a combination thereof. An actuation signal such as a square wave, triangle wave, sinusoid, or other waveform may be applied to one or more electrodes (e.g., electrodes 32, 34). In response to the actuation signal, one or more of the electrodes (e.g., electrodes 32, 34) may generate an electrical signal having a property, such as amplitude, corresponding to angular acceleration. The electrical signal corresponding to angular acceleration may also be generated without an actuation signal. With reference to FIG. 4, feedback control loop architecture 40 may include a sigma-delta modulator 42, which receives the electrical signal corresponding to angular acceleration and may be used to convert the measurement signal into a bit-stream voltage output. The output voltage may be passed through an integrator 44, a charge amplifier 46, and a proportional-integral-derivative (PID) controller 48 before applying a coarse quantization process 50. The analog signal may be converted into a bit-stream sequence. The bit-stream may then be sent to a force feedback generator 52, which may provide the actuation signal to electrodes of the MEMS-based rotation sensor (e.g., electrode 32) to create electrostatic forces proportional to the bit-stream average. This may physically damp the oscillations of the seismic mass 14 (e.g., proof mass) by applying the electrostatic force thereto. This may be accomplished by keeping the voltage levels constant and modulating the average force by pulse-density control or other control algorithms. Such a process leverages principles underlying sigma-delta modulation, such as oversampling of an analog signal, bit-stream conversion of an analog signal (where a bit-stream average is a measure of the input signal) and oversampling to cause the quantization noise to spread over a wide bandwidth. It will be appreciated that the electrodes may be arranged such that a first set of the electrodes receive the actuation signal and a second set of the electrodes generate the electrical signal corresponding to angular acceleration. The first and second sets may or may not overlap. Some, or all, of the electrodes may receive the activation signal and also generate the electrical signal corresponding to angular acceleration.

Figure 5:
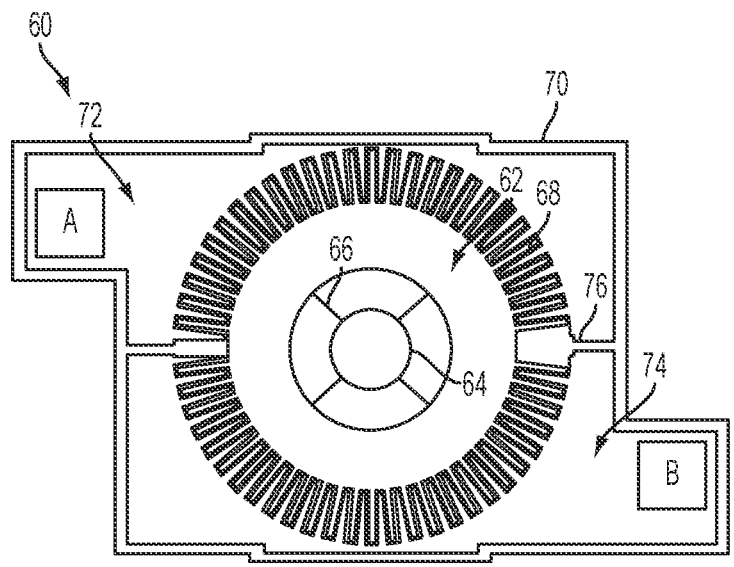
FIG. 5 illustrates a schematic view of a MEMS-based rotation sensor according to the present disclosure.

The present disclosure contemplates several variations of how electrodes are distributed around the seismic mass. For example, referring to FIG. 5, a MEMS-based rotation sensor 60 includes a seismic mass 62 disposed about a central anchor 64. The seismic mass 62 is coupled to the anchor 64 via a plurality of flexural springs 66. In one embodiment, the MEMS-based rotation sensor 60 includes four flexural springs 66. The seismic mass 62 includes a plurality of electrodes 68 (e.g., beam-shaped electrodes) extending from and adapted to move with the seismic mass. The MEMS-based rotation sensor 60 is disposed on a substrate 70, which includes a pair of fixed electrodes 72, 74 disposed at opposing sides of the seismic mass 62. A trench 76 separates the areas of the substrate 70 having the electrodes 72, 74.

Figure 6:
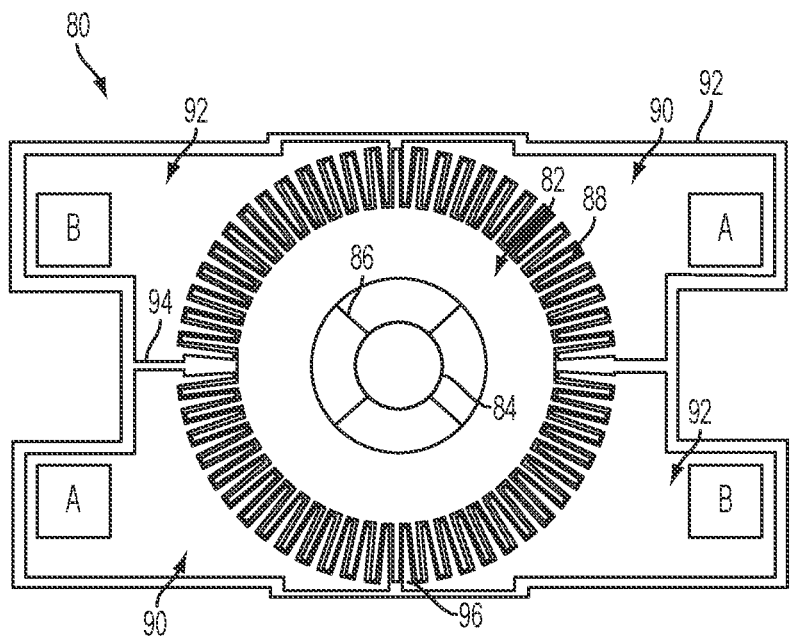
FIG. 6 illustrates a schematic view of a MEMS-based rotation sensor according to the present disclosure.

Referring to FIG. 6, in another embodiment, a MEMS-based rotation sensor 80 includes a seismic mass 82 coupled to a central anchor 84 via a plurality of flexural springs 86. The seismic mass 82 includes a plurality of electrodes 88 (e.g., in a beam configuration) extending from and adapted to move with the seismic mass. In this embodiment, electrodes 90, 92 are split and distributed around the seismic mass 82. The MEMS-based rotation sensor 80 is disposed on a substrate 92 and includes a pair of trenches 94, 96 to separate the areas of the substrate having the electrode sets 88, 90.

It is to be appreciated that several variations of the MEMS-based rotation sensor described herein are contemplated. For example, gap closing combs, sliding combs and sliding masses may be employed. Also, different control mechanism may be used, including direct capacitance measurements, differential capacitance measurements in an open loop, and differential capacitance measurements in a closed loop with force feedback. Furthermore, it is contemplated that the MEMS-based rotation sensor described herein may be used with a variety of other seismic sensors. For example, when used with a translational accelerometer, the MEMS-based rotation sensor would measure the gradient of any signals measured by the translational accelerometer. Indeed, in such embodiments, the translational accelerometer may be a MEMS-based translational accelerometer that utilizes the same feedback control loop architecture 40 (FIG. 4) as the MEMS-based rotation sensor.

The MEMS-based rotation sensors described herein may be used in the seismic data acquisition context to reduce the number of sensor nodes and/or increase the spacing among such nodes, thus resulting in larger deployable arrays and/or lower operating costs. More particularly, the MEMS-based rotation sensors described herein may be used to measure the gradient of any signal acquired by translational accelerometers deployed in a seismic survey. In land seismic surveys, for example, surface waves (e.g., ground roll waves) have an apparent wavelength close to their true wavelength since they are propagating with a large emergent angle. Surface waves typical of land seismic operation noises have higher amplitudes due to their stronger energy and their small apparent wavelength at the free surface.

Figure 7:
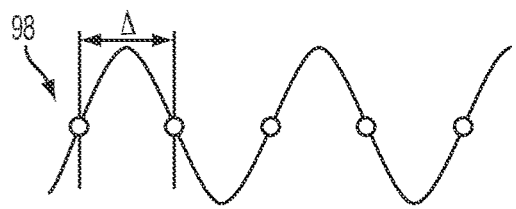
FIG. 7 illustrates a schematic view of a Nyquist sampling.
Figure 8:
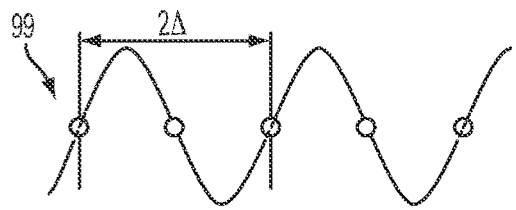
FIG. 8 illustrates a schematic view of a Papoulis sampling.

The MEMS-based rotation sensors described herein are well-suited to measure the spatial gradients of noise components at the free surface. As a result of such gradient measurements, it is possible to interpolate noise components between sensor nodes, thus allowing for sparser spatial sampling. For example, rather than employing a standard Nyquist sampling 98 requiring two measurements for the shortest wavelength of a signal (FIG. 7), the MEMS-based rotation sensors according to the present disclosure permit Papoulis sampling 99, which only requires co-located measurements of the vertical wavefield and its gradient at each cycle for the shortest wavelength (FIG. 8). Accordingly, deploying MEMS-based rotation sensors according to the present disclosure requires fewer sensors for seismic data acquisition without compromising data quality. Further, deployment of MEMS-based rotation sensors described herein allows for local noise attenuation without using data from other sensors. Accordingly, local noise attenuation can be accomplished independent of sensor spacing. In one embodiment, rotation measurement data may be used as a noise model for adaptive subtraction of ground roll noise.

The MEMS-based rotation sensors described herein (e.g., MEMS-based rotation sensors 10, 30, 60, 80) may be used in a variety of seismic data acquisition systems. For example, with reference to FIG. 9, an arrangement of sensor assemblies 100 that are used for land-based seismic surveying are deployed on a ground surface 102. The ground surface 102 overlies a geological formation 104 of interest, such as a hydrocarbon reservoir. One or more seismic sources 106, which can be vibrators, air guns, or explosive devices, are deployed in a survey field in which the sensor assemblies 100 are located.

Figure 10:
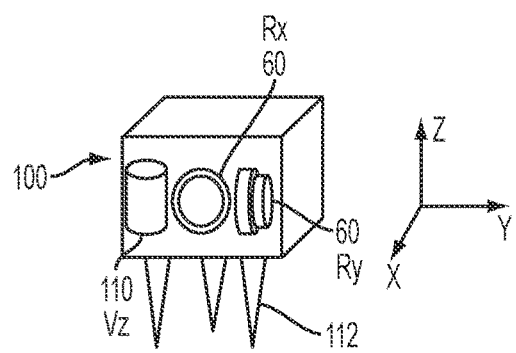
FIG. 10 illustrates a schematic view of a sensor unit incorporating a MEMS-based rotation sensor according to the present disclosure.

Activation of the seismic sources 106 causes seismic waves to be propagated into the geological formation 104. The seismic waves are then reflected from subterranean structure 108 (including geological formation 104) and are propagated upwardly towards the sensor assemblies 100. Sensors within the sensor assemblies measure the seismic waves reflected from the subterranean structure 108. For example, referring to FIG. 10, an exemplary sensory assembly 100 is illustrated to include a pair of MEMS-based rotation sensors (e.g., rotation sensor 60) according to the present disclosure as well as a MEMS-based translational accelerometer 110. It is to be appreciated that the MEMS-based rotation sensors 60 shown in FIG. 10 may be replaced with any MEMS-based rotation sensor disclosed herein. In the embodiment of FIG. 10, the sensor assembly 100 includes the MEMS-based rotation sensors 60 positioned orthogonally to one another such that one of the MEMS-based rotation sensors measures the x-component of the horizontal gradient of the vertical wavefield and the other of the MEMS-based rotation sensor measures the y-component of the horizontal gradient of the vertical wavefield. The sensor assembly 100 may further include one or more spikes 112, or coupling elements, to improve coupling of the sensor assembly to the ground surface. According to another embodiment, the sensor assembly 100 may be entirely or partially inserted into the ground, proximate the surface, so as to be coupled to the ground and sensitive to ground roll. According to an embodiment, the sensor assembly 100 can extend across the ground surface.

Referring again to FIG. 9, in one embodiment, the sensor assemblies 100 are interconnected by an electrical cable 114 (or other type of communication medium) to a signal processing unit 150. Alternatively, instead of connecting the sensor assemblies 100 by the electrical cable 114, the sensor assemblies can communicate wirelessly with the controller signal processing unit (for cable-free sensor assemblies). In some implementations, intermediate routers or concentrators may be provided at intermediate points of the network of sensor assemblies 100 to enable communication between the sensor assemblies and the signal processing unit 150.

Figure 9:
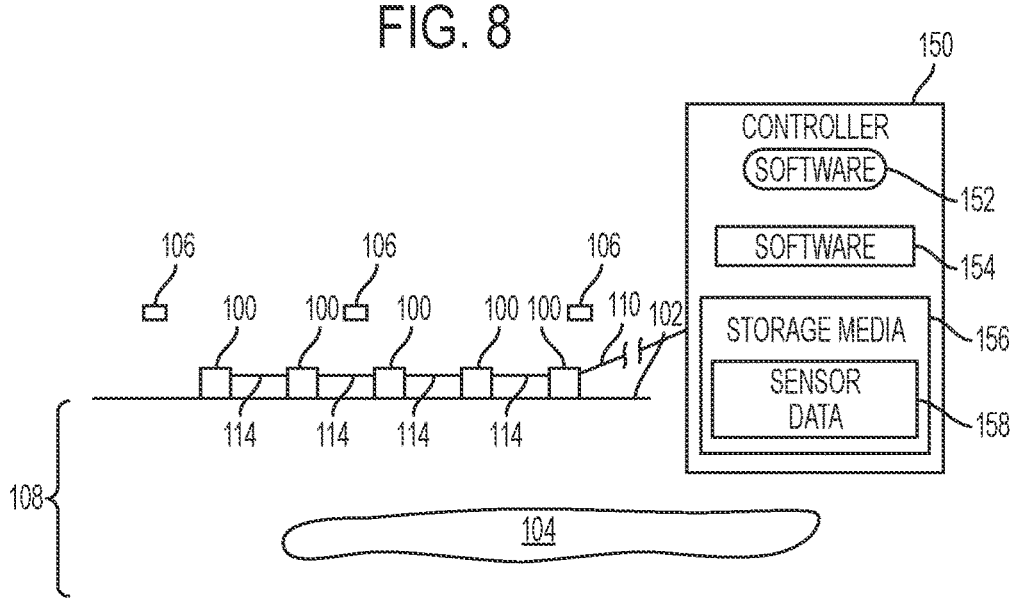
FIG. 9 illustrates a schematic view of a land-based seismic data acquisition system incorporating a MEMS-based rotation sensor according to the present disclosure.

The signal processing unit 150 shown in FIG. 9 further includes processing software 152 that is executable on a processor 154. The processor 154 is connected to storage media 156 (e.g., one or more disk-based storage devices and/or one or more memory devices). The storage media 156 is used to store sensor data 158, which includes output data produced by each of the sensor assemblies 100. In operation, the software 152 in the signal processing unit 150 is executable to process the sensor data 158 to produce an output to characterize the geological formation 104. It should be appreciated that the items in the processing unit 150 can be incorporated into the sensor units 100. This could be used in a "blind node" arrangement, where individual nodes are self contained with respect to collected data and/or power and/or communication.

Figure 11:
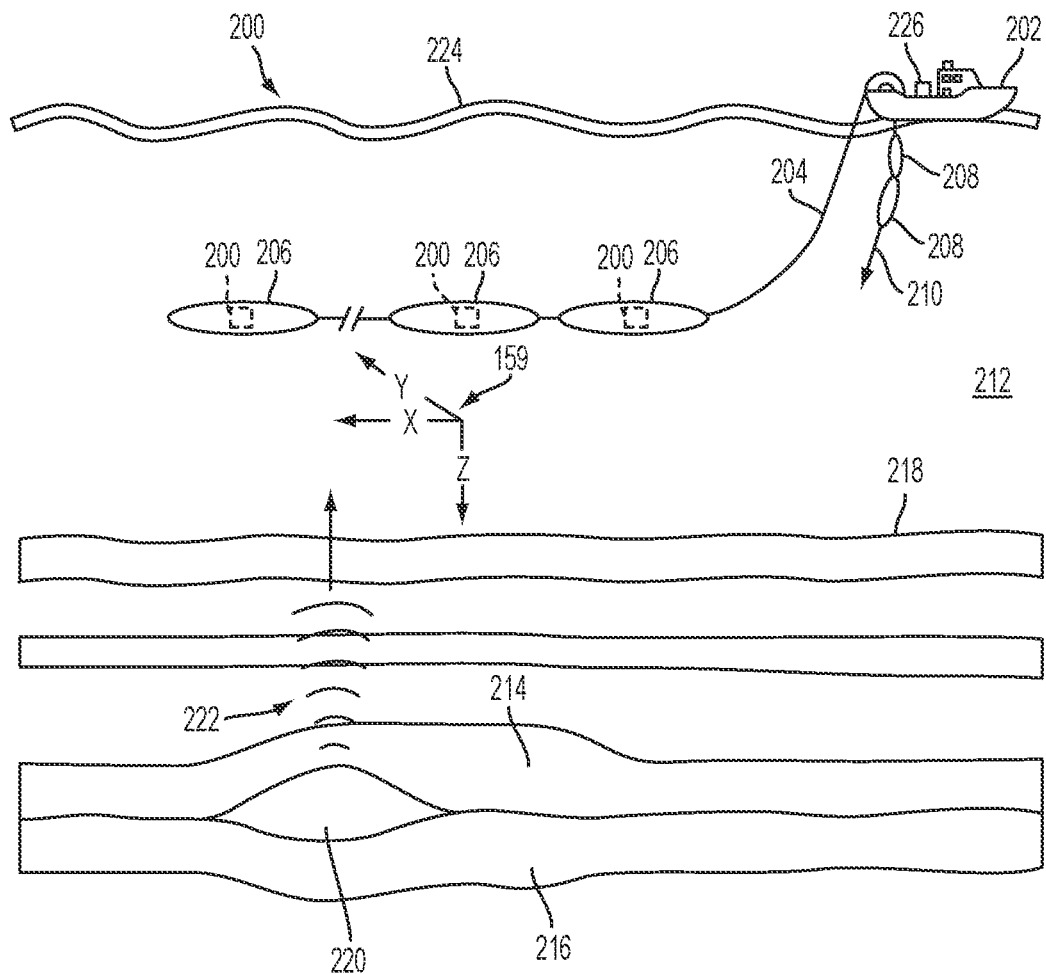
FIG. 11 illustrates a marine-based seismic data acquisition system incorporating a MEMS-based rotation sensor according to the present disclosure.

The MEMS-based rotation sensors 10, 30, 60, 80 described herein may be also be used in marine seismic data acquisition systems. For example, FIG. 11 depicts an embodiment of a marine-based seismic data acquisition system 200 in accordance with some embodiments of the present disclosure. In the system 200, a survey vessel 202 tows one or more seismic streamers 204 (one exemplary streamer 204 being depicted in FIG. 11) behind the vessel. It is noted that the streamers 204 may be arranged in a spread in which multiple streamers are towed in approximately the same plane at the same depth. As another example, the streamers 204 may be towed at multiple depths, such as in an over/under spread, for example.

The seismic streamers 204 may be several thousand meters long and may contain various support cables (not shown), as well as wiring and/or circuitry (not shown) that may be used to support communication along the streamers. In general, each streamer 204 includes a primary cable into which is mounted seismic sensors that record seismic signals. In accordance with embodiments of the present disclosure, the streamers 204 contain seismic sensor units 206, which may include a hydrophone, particle motion sensors and the MEMS-based rotation sensor 10, 30, 60, 80 described herein. Thus, each sensor unit 206 is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components) of a particle velocity and one or more components of a particle acceleration. Each sensor unit 206 is further capable of detecting angular accelerations of vibration noise.

Depending on the particular embodiment of the present disclosure, the sensor units 206 may include one or more hydrophones, geophones, particle displacement sensors, particle velocity sensors, accelerometers, pressure gradient sensors, rotation sensors or combinations thereof. For example, the sensor units 206 may include a capacitive microelectromechanical system (MEMS)-based sensor that is sensitive to translational accelerations and the MEMS-based rotation sensor 10, 30, 60, 80 that is sensitive to angular accelerations.

The marine seismic data acquisition system 200 further includes seismic sources 208 (two exemplary seismic sources 208 being depicted in FIG. 11), such as air guns and the like. In some embodiments of the present disclosure, the seismic sources 208 may be coupled to, or towed by, the survey vessel 202. Alternatively, in other embodiments, the seismic sources 208 may operate independently of the survey vessel 202, in that the sources may be coupled to other vessels or buoys.

As the seismic streamers 204 are towed behind the survey vessel 202, acoustic signals 210, often referred to as "shots," are produced by the seismic sources 208 and are directed down through a water column 212 into strata 214 and 216 beneath a water bottom surface 218. The acoustic signals 210 are reflected from the various subterranean geological formations, such as an exemplary formation 220 that is depicted in FIG. 11.

The incident acoustic signals 210 that are created by the sources 208 produce corresponding reflected acoustic signals, or pressure waves 222, which are sensed by the seismic sensors of the streamer(s) 204. It is noted that the pressure waves that are received and sensed by the seismic sensors include "up going" pressure waves that propagate to the sensors without reflection, as well as "down going" pressure waves that are produced by reflections of the pressure waves 222 from an air-water boundary, or free surface 224.

The seismic sensors of the streamer(s) 204 generate signals (digital signals, for example), called "traces," which indicate the acquired measurements of the pressure wavefield and particle motion. The traces are recorded and may be at least partially processed by a signal processing unit 226 (e.g., a unit the same or similar to the signal processing unit 150 of FIG. 9) that is deployed on the survey vessel 202, in accordance with some embodiments of the present disclosure. For example, a particular multi-component sensor may provide a trace, which corresponds to a measure of a pressure wavefield by its hydrophone; and the sensor may provide one or more traces that correspond to one or more components of particle motion. The sensor unit may further sense angular accelerations via the MEMS-based rotation sensor described herein. Such measurements facilitate the removal of transverse vibration noise.

The goal of the seismic acquisition is to build up an image of a survey area for purposes of identifying subterranean geological formations, such as the exemplary geological formation 220. Subsequent analysis of the representation may reveal probable locations of hydrocarbon deposits in subterranean geological formations. In some embodiments, portions of the analysis of the representation may be performed on the seismic survey vessel 202, such as by the signal processing unit 226. In accordance with other embodiments, the representation may be processed by a seismic data processing system located remotely of the vessel 202. Thus, many variations are possible and are within the scope of the appended claims.

While various embodiments of a MEMS-based rotation sensor and related methods of using MEMS-based rotation sensors have been described above, it should be understood that they have been presented by way of example only, and not limitation. For example, while the MEMS-based rotation sensor 10 is described for use in seismic data acquisition systems, it is to be appreciated that the sensor may be used in other data acquisition systems outside of the field of seismic data acquisition. Thus, the breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A seismic data acquisition system, comprising:
   one or more sources configured to generate seismic waves; and
   one or more sensor units configured to record seismic waves generated by the one or more sources, the one or more sensor units comprising a first seismic sensor configured to measure a vertical wavefield of the seismic waves, and a second seismic sensor configured to measure a gradient of the vertical wavefield, wherein the second seismic sensor comprises:
   an anchor disposed on a substrate;
   a proof mass coupled to the anchor via a plurality of flexural springs, the proof mass having a first electrode adapted to move with the proof mass; and
   a second electrode disposed on the substrate, one of the first and second electrodes being configured to generate an electrical signal having an amplitude corresponding with a degree of angular movement of the first electrode relative to the second electrode or the second electrode relative to the first electrode.

2. The seismic data acquisition system of claim 1, wherein the one or more sources comprise one or more air guns.

3. The seismic data acquisition system of claim 1, comprising one or more streamers, wherein the one or more streamers comprise the one or more sensor units.

4. The seismic data acquisition system of claim 1, wherein the first seismic sensor is configured to measure a first set of components of a particle motion comprising a particle displacement, a second set of components of a particle velocity, and a third set of components of a particle acceleration.

5. The seismic data acquisition system of claim 4, wherein the first seismic sensor comprises a particle displacement sensor configured to measure the particle displacement.

6. The seismic data acquisition system of claim 1, wherein the first seismic sensor comprises a one-component particle velocity sensor.

7. The seismic data acquisition system of claim 1, wherein the first seismic sensor comprises a three-component particle motion sensor.

8. The seismic data acquisition system of claim 7, wherein the three-component particle motion sensor comprises a three-component particle accelerometer configured to measure one or more components of a particle acceleration.

9. The seismic data acquisition system of claim 1, wherein the gradient of the vertical wavefield comprises a first horizontal gradient of the vertical wavefield.

10. The seismic data acquisition system of claim 9, comprising a third seismic sensor for measuring a second horizontal gradient of the vertical wavefield, wherein the third seismic sensor is a microelectromechanical system (MEMS) sensor positioned orthogonally to the second seismic sensor, and wherein the second horizontal gradient is orthogonally to the first horizontal gradient.

11. The seismic data acquisition system of claim 1, comprising a hydrophone or a pressure gradient sensor.

12. The seismic data acquisition system of claim 1, wherein the one or more sensor units are configured to measure angular accelerations of vibration noise.

13. The seismic data acquisition system of claim 1, wherein the first seismic sensor and the second seismic sensor are configured to generate electrical signals that are sent through closed loop circuitry configured to provide an actuation signal.

14. The seismic data acquisition system of claim 13, wherein the electrical signals comprise analog signals and the closed loop circuitry is configured to convert the analog signals into respective bit stream sequences.

15. The seismic data acquisition system of claim 14, wherein the closed loop circuitry comprises a force feedback generator for receiving the respective bit stream sequences and converting the respective bit stream sequences into the actuation signal.

16. A sensor assembly, comprising:
a first seismic sensor configured to measure one or more components of a particle motion associated with seismic waves;
a second seismic sensor configured to measure a gradient of one of the one or more components of the particle motion, wherein the second seismic sensor comprises:
an anchor disposed on a substrate;
a proof mass coupled to the anchor via a plurality of flexural springs, the proof mass having a first electrode adapted to move with the proof mass; and
a second electrode disposed on the substrate, one of the first and second electrodes being configured to generate an electrical signal having an amplitude corresponding with a degree of angular movement of the first electrode relative to the second electrode or the second electrode relative to the first electrode; and
a third seismic sensor configured to measure a pressure wavefield associated with the seismic waves.

17. The sensor assembly of claim 16, wherein the first seismic sensor comprises a microelectromechanical system (MEMS) translational accelerometer configured to measure translational accelerations of the particle motion.

18. The sensor assembly of claim 16, wherein the second seismic sensor comprises a microelectromechanical system (MEMS) sensor configured to measure angular accelerations of the particle motion.

19. A sensor unit, comprising:
a first microelectromechanical system (MEMS) sensor configured to measure one or more components of a particle motion associated with seismic waves generated by one or more sources;
a second MEMS sensor configured to measure a gradient of one of the one or more components of the particle motion, wherein the second MEMS sensor comprises:
an anchor disposed on a substrate;
a proof mass coupled to the anchor via a plurality of flexural springs, the proof mass having a first electrode adapted to move with the proof mass; and
a second electrode disposed on the substrate, one of the first and second electrodes being configured to generate an electrical signal having an amplitude corresponding with a degree of angular movement of the first electrode relative to the second electrode or the second electrode relative to the first electrode; and
a seismic sensor configured to measure a pressure wavefield associated with the seismic waves.

20. The sensor unit of claim 19, comprising closed loop circuitry configured to receive the electrical signal having the amplitude corresponding with the degree of angular movement of the first electrode positioned within the sensor unit relative to the second electrode positioned within the sensor unit, wherein the closed loop circuitry comprises a sigma-delta modulator and the electrical signal passes through the sigma-delta modulator.

* * * * *